United States Patent
Xue et al.

(10) Patent No.: US 11,968,646 B2
(45) Date of Patent: Apr. 23, 2024

(54) FREQUENCY FLOATING SIDELINK CONTROL INFORMATION FOR NEW RADIO

(71) Applicant: QUALCOMM Incorporated, San Diego, CA (US)

(72) Inventors: Yisheng Xue, San Diego, CA (US); Xiaojie Wang, Hillsborough, NJ (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/304,830

(22) Filed: Jun. 25, 2021

(65) Prior Publication Data
US 2022/0417908 A1    Dec. 29, 2022

(51) Int. Cl.
*H04W 72/04* (2023.01)
*H04W 72/02* (2009.01)
*H04W 72/0453* (2023.01)
*H04W 72/541* (2023.01)

(52) U.S. Cl.
CPC ....... *H04W 72/02* (2013.01); *H04W 72/0453* (2013.01); *H04W 72/541* (2023.01)

(58) Field of Classification Search
CPC ............. H04W 72/02; H04W 72/0453; H04W 72/541; H04W 72/40; H04W 72/542
See application file for complete search history.

(56) References Cited

U.S. PATENT DOCUMENTS

| | | | |
|---|---|---|---|
| 2011/0044214 A1* | 2/2011 | Fujii | H04L 27/2601 370/278 |
| 2020/0305127 A1* | 9/2020 | Huang | H04W 72/0453 |
| 2021/0051630 A1* | 2/2021 | Chae | H04W 72/02 |
| 2021/0167926 A1* | 6/2021 | Lin | H04L 1/1861 |
| 2021/0168632 A1* | 6/2021 | Lee | H04L 5/0053 |
| 2021/0219320 A1* | 7/2021 | Belleschi | H04W 76/14 |
| 2021/0314962 A1* | 10/2021 | Ashraf | H04W 76/14 |
| 2021/0352625 A1* | 11/2021 | Akkarakaran | H04B 7/06954 |
| 2021/0400639 A1* | 12/2021 | Lee | H04W 72/02 |
| 2022/0140964 A1* | 5/2022 | Chen | H04L 5/0048 370/330 |
| 2022/0303954 A1* | 9/2022 | Hwang | H04W 28/26 |
| 2022/0303985 A1* | 9/2022 | Miao | H04W 72/0446 |
| 2022/0322290 A1* | 10/2022 | Aktas | H04W 72/20 |
| 2022/0338204 A1* | 10/2022 | Jung | H04W 92/18 |
| 2023/0105567 A1* | 4/2023 | Zhao | H04L 27/2602 370/329 |

* cited by examiner

Primary Examiner — Ricky Q Ngo
Assistant Examiner — Kabir U Jahangir
(74) Attorney, Agent, or Firm — QUALCOMM Incorporated

(57) ABSTRACT

Wireless communications systems and methods related to communicating control information are provided. A method of wireless communication performed by a user equipment (UE) may include sensing an interference level of at least one frequency, selecting, based on the interference level, a frequency, and communicating sidelink control information (SCI) in the selected frequency.

29 Claims, 11 Drawing Sheets

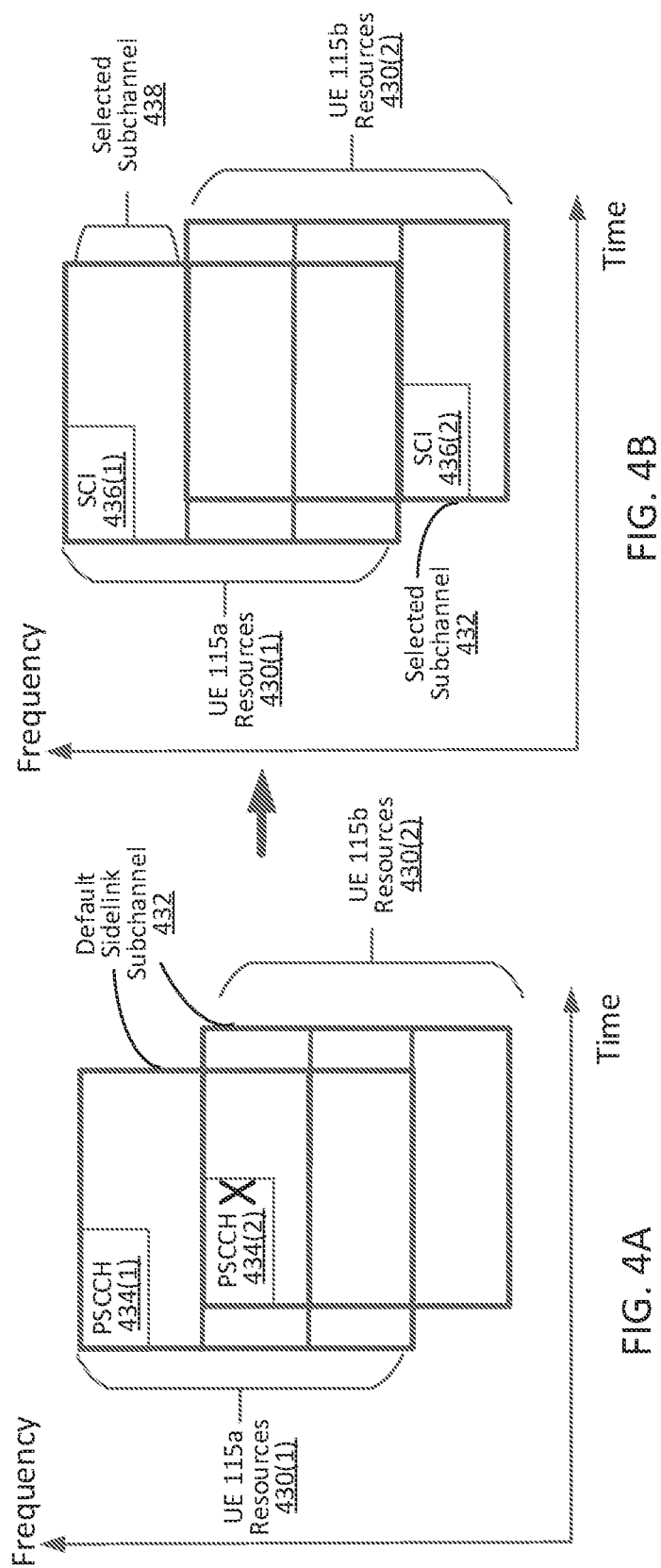

FREQUENCY FLOATING SIDELINK CONTROL INFORMATION FOR NEW RADIO

TECHNICAL FIELD

This application relates to wireless communication systems, and more particularly to communicating sidelink control information in a frequency selected based on interference conditions.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) may include sensing an interference level of at least one frequency; selecting, based on the interference level, a frequency; and communicating sidelink control information (SCI) in the selected frequency.

In an additional aspect of the disclosure, a method of communication performed by a base station (BS) may include sensing an interference level of at least one frequency; selecting, based on the interference level, a frequency for communicating sidelink control information (SCI); and transmitting, to a UE, an indication of the selected frequency for communicating the SCI.

In an additional aspect of the disclosure, a UE may include a transceiver, a memory, and a processor coupled to the transceiver and the memory, the UE may be configured to sense an interference level of at least one frequency; select, based on the interference level, a frequency; and communicate sidelink control information (SCI) in the selected frequency.

In an additional aspect of the disclosure, a BS may include a transceiver, a memory, and a processor coupled to the transceiver and the memory, the BS may be configured to sense an interference level of at least one frequency; select, based on the interference level, a frequency for communicating sidelink control information (SCI); and transmit, to a user equipment (UE), an indication of the selected frequency for communicating the SCI.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

BRIEF DESCRIPTION OF THE DRAWINGS

FIGS. 4A and 4B illustrate sidelink resource selection based on an interference condition according to some aspects of the present disclosure.

DETAILED DESCRIPTION

Figure 1:
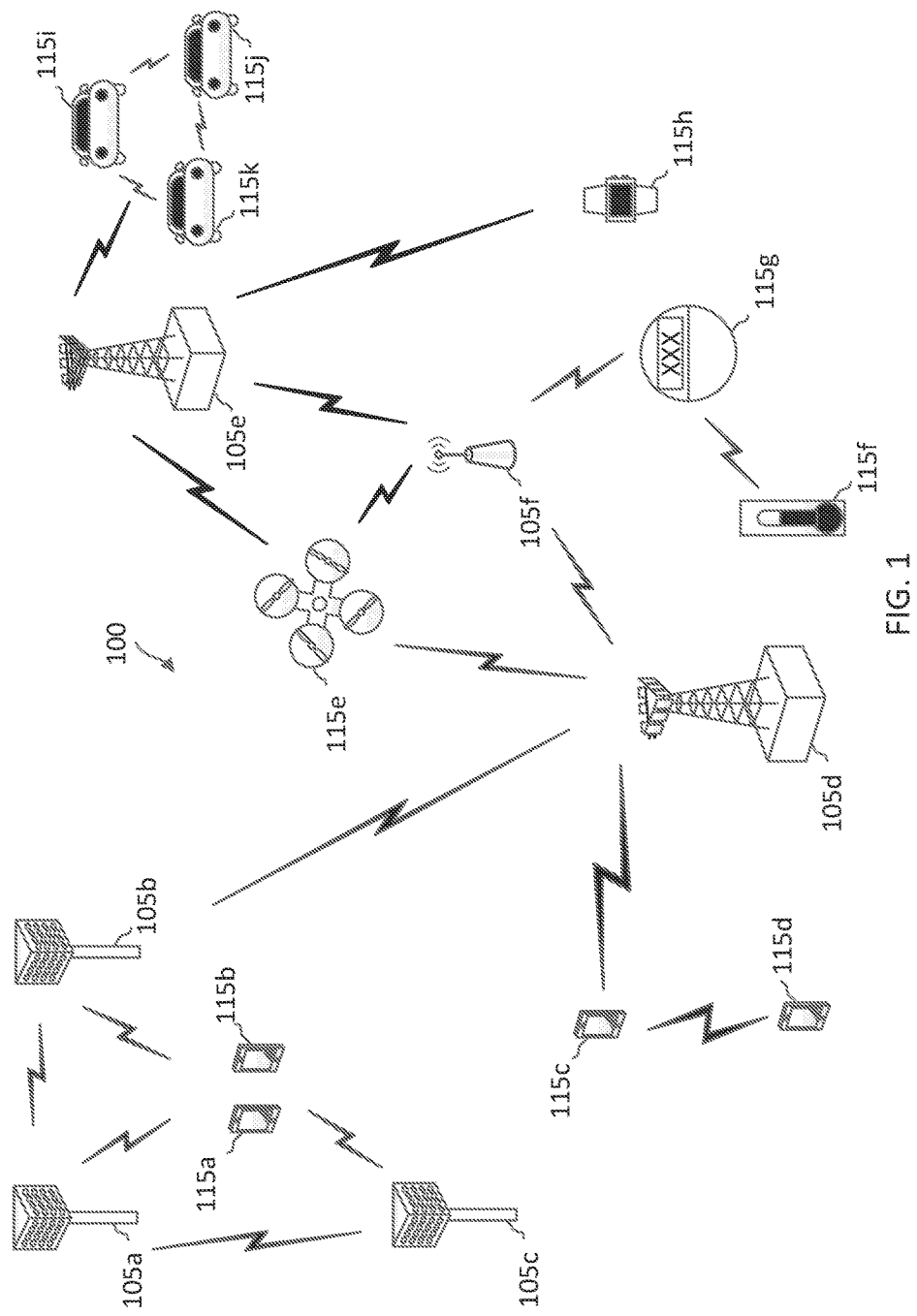
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for wireless network devices to communicate sidelink control information (SCI) in a selected frequency. The disclosed approaches include various methods of selecting the frequency based on a level of interference within a communication channel. The disclosed approaches further include various methods of transmitting the selected frequency to UEs that communicate using sidelink communications.

In some aspects of the present disclosure, the reliability of wireless communications, including sidelink control and data communications, may be increased by communicating in frequencies that have a low level of interference as compared to communicating in frequencies that have a higher level of interference. A wireless communications device (e.g., a UE, a BS, etc.) may sense a level of interference in certain frequencies (e.g., bands of frequencies, subchannels of frequencies, shared frequencies, etc.). The wireless communications device may select a frequency for communication based on the level of interference. For example, the wireless communications device may measure the level of interference in certain frequencies, compare the interference level to a threshold, and select a frequency and/or a range of frequencies for communication based on the interference level satisfying the threshold. In some aspects, the interference level may be based on a signal-plus-interference to noise ratio (SINR) associated with the frequency. For example, the wireless communications device may measure the SINR of the frequencies and select a frequency that has an SINR above a threshold. Additionally or alternatively, the wireless communications device may estimate a gain associated with the communication channel. The wireless communications device may select the frequency further based on the estimated gain associated with the communication channel.

In some aspects, a BS may sense an interference level of a frequency and select, based on the interference level, a frequency for sidelink communication between UEs. For example, a BS may select a frequency based on an interference level and transmit an indication to a first UE of the selected frequency. The first UE may use the selected frequency for communicating sidelink control information (SCI) to a second UE. For example, the BS may transmit the indication of the selected frequency to the first UE via downlink control information (DCI) over a physical downlink control channel (PDCCH). The first UE may communicate with the second UE in the selected frequency over a sidelink channel.

In some aspects, the first UE may communicate control information to the second UE in the selected frequency. For example, the first UE may communicate SCI in the selected frequency. As another example, the first UE may communicate a physical sidelink control channel (PSCCH) in the selected frequency. As another example, the first UE may communicate an indicator that indicates a first resource of a physical sidelink shared channel (PSSCH) in the selected frequency. As described herein, the terms "frequency" and "subchannel" may be used interchangeably. In some aspects a subchannel may include a number of physical resource blocks that may be (pre-)configured. For example, a subchannel may include 10, 12, 15, 20, 25, or some other number of physical resource blocks.

In some aspects, a physical (PHY) layer of the wireless communications device may select the frequency for communication. Additionally or alternatively, a medium access (MAC) layer of the wireless communications device may select the frequency for communication. For example, a physical layer may measure the level of interference for certain frequencies and provide the measurements to the MAC layer. The MAC layer may select the frequency based at least on the physical layer measurements.

In accordance with the present disclosure, selecting a frequency for communicating SCI based on interference levels may facilitate more efficient use and optimization of the frequency resources, higher reliability of the wireless communications network, and reduced power usage of the UE and/or BSs. In this regard, selecting a frequency for communicating sidelink control information based on interference levels may reduce the data load on the wireless network due to a reduction in retransmissions, and reduce the latency associated with communicating the SCI and/or sidelink data.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115k (e.g., a vehicle, a car, a bus, a truck, a bike, an aircraft, a boat, etc.) may sense a level of interference in certain frequencies (e.g., bands of frequencies, subchannels of frequencies, shared frequencies, a set of PRBs, etc.). The UE 115k may select a frequency for communication based on the level of interference. For example, the UE 115k may measure the level of interference for certain frequencies, compare the interference level to a threshold, and select a frequency and/or a range of frequencies such as a subchannel for communication. In some aspects, the interference level may be based on a signal-plus-interference to noise ratio (SINR) associated with the frequency. For example, the UE 115k may measure the SINR of the frequencies and select a frequency that has an SINR above a threshold. The UE 115k may communicate SCI in the selected frequency. For example, the UE 115k may communicate SCI in the selected frequency to UE 115i and/or UE 115j.

In some aspects, the BS 105e may sense an interference level of a frequency and select, based on the interference level, a frequency for communication between UEs 115i, 115j, and/or 115k. For example, the BS 105e may select a frequency based on an interference level and transmit an indication to the UE 115k of the selected frequency for communication. The UE 115k may use the selected frequency for communicating with the UE 115i and/or the UE 115j. For example, the BS 105e may transmit the indication of the selected frequency to the UE 115k via downlink control information (DCI) over a physical downlink control channel (PDCCH).

In some aspects, the UE 115k may communicate control information to the UE 115i and/or the UE 115j in the selected frequency. For example, the UE 115k may communicate SCI in the selected frequency. As another example, the UE 115k may communicate a physical sidelink control channel (PSCCH) in the selected frequency. As another example, the UE 115k may communicate an indicator to the UE 115i and/or the UE 115j that indicates a first resource of a physical sidelink shared channel (PSSCH). Mechanisms for selecting a frequency for communicating SCI based on interference conditions are described in greater detail herein. In the present disclosure, a reference to PSCCH may refer to any message or signal carried by the PSCCH. For example, the first stage SCI may be carried by the PSCCH. Any or all of the information elements of the first stage SCI may be carried by the PSCCH.

Figure 2:
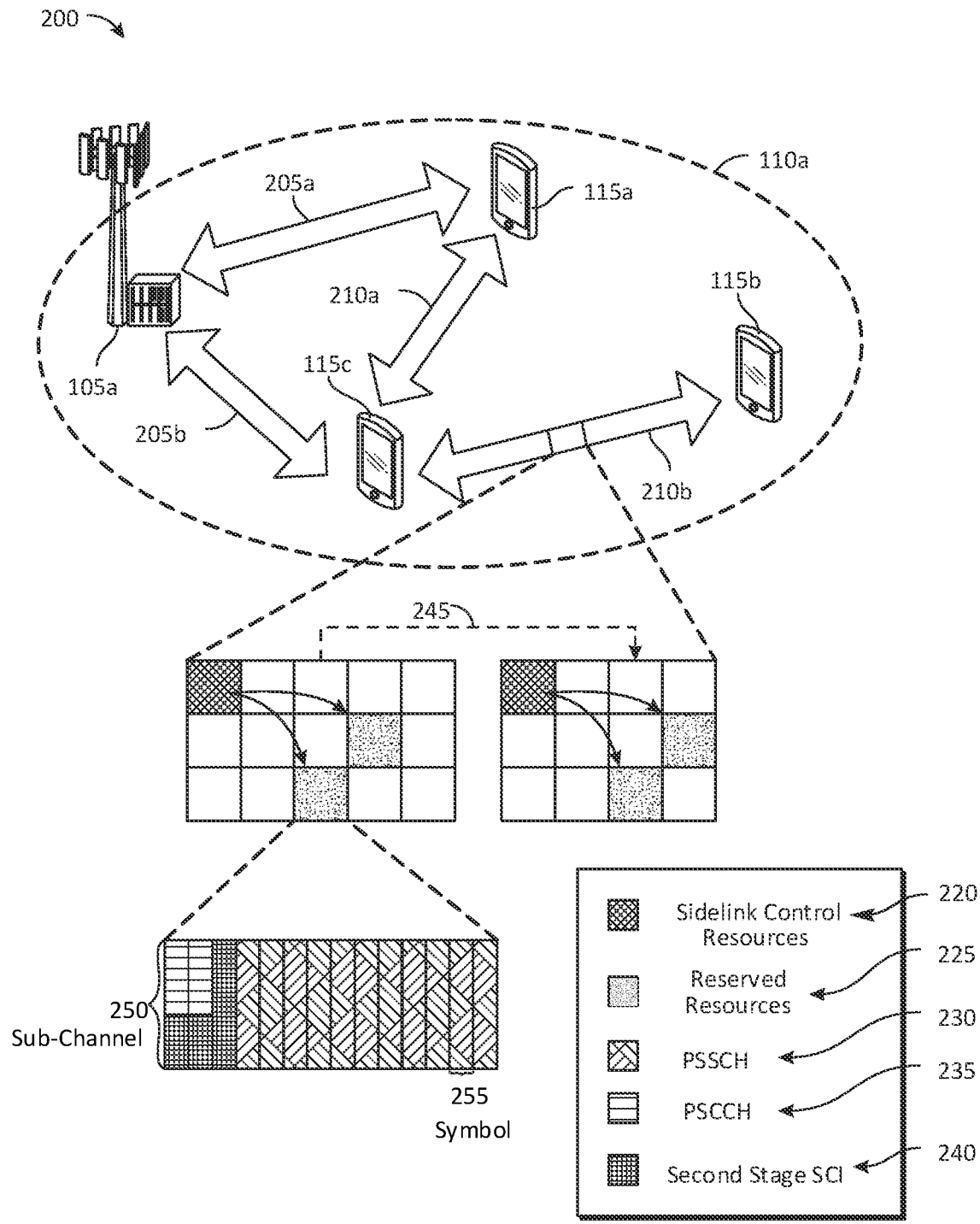
FIG. 2 illustrates sidelink resources associated with a wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X)

device, or other node). The SCI may be conveyed in one or more stages. The first stage SCI in may be carried on the PSCCH while the second stage SCI may be carried on the corresponding PSSCH. For example, UE 115c may transmit a PSSCCH/first stage SCI 235 (e.g., SCI1) to each sidelink UE 115 in the network (e.g., UEs 115a and 115b), via the sidelink communication links 210. The PSSCH/first stage SCI 235 may indicate resources that are reserved by UE 115c for retransmissions (e.g., the SCI1 may indicate the reserved resources 225 for retransmissions). Each sidelink UE 115 may decode the first stage SCI to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel Mode 1 operations are discussed in more detail with reference to FIG. 7. Sidelink communication may also include a mode 2 operation in which the UEs 115 operate autonomously from the BS 115a and perform sensing of the channel to gain access to the channel. In some aspects, during Mode 2 sidelink operations, the sidelink UEs 115 may perform channel sensing to locate resources reserved by other sidelink transmissions. The first stage SCI may reduce the need for sensing each channel. For example, the first stage SCI may include an explicit indication such that the UEs 115 may refrain from blindly decoding each channel. The first stage SCI may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. As will be described below with reference to FIGS. 3, 4A, 4B, 5A, 5B, 7, and 10, the frequency may be selected based on an interference level associated with the frequency. The frequency may include a single subchannel 250 (e.g., 10, 12, 15, 20, 25, or some other number of RBs within the subchannel 250). The time duration of the PSCCH 235 may be configured (e.g., the PSCCH 235 may span 2, 3, or some other number of symbols 255).

The first stage SCI may include one or more fields to indicate a location of the reserved resources 225. For example, the first stage SCI may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI 240, a beta offset value for the second stage SCI 240, a DMRS port (e.g., one bit indicating a number of data layers), a physical sidelink feedback channel (PSFCH) overhead indicator, a priority, one or more additional reserved bits, or a combination thereof. As will be described with reference to FIG. 5B, the SCI may include an indicator of a starting resource of the PSSCH. In some examples, the FDRA may be a number of bits in the first stage SCI that may indicate a number of slots and a number of subchannels reserved for the reserved resources 225 (e.g., a receiving UE 115 may determine a location of the reserved resources 225 based on the FDRA by using the subchannel 250 including the PSCCH 235 and first stage SCI as a reference). The TDRA may be a number of bits in the first stage SCI (e.g., 5 bits, 9 bits, or some other number of bits) that may indicate a number of time resources reserved for the reserved resources 225. In this regard, the first stage SCI may indicate the reserved resources 225 to the one or more sidelink UEs 115 in the wireless communication network 200.

The sidelink UEs 115 may attempt to decode the reserved resources 225 indicated by the first stage SCI. In some aspects, the reserved resources 225 may be used for retransmission of sidelink data or the first stage SCI. Additionally or alternatively, the reserved resources 225 may include resources for sidelink transmissions, such as a PSSCH 230. The PSSCH 230 may be transmitted via one or more subchannels 250 and may include a number of symbols 255. In some examples, the PSSCH 230 may include the PSCCH 235 (e.g., the PSCCH 235 may be transmitted via one or more time or frequency resources via one or more full or partial symbols 255 of the PSSCH 230). A second stage SCI 240 may be transmitted via one or more symbols 255 of the PSSCH 230. The second stage SCI 240 may be transmitted in a symbol(s) near or at the beginning of a PSCCH/PSSCH slot. The second stage SCI 240 may include an indication of which of the reserved resources 225 the transmitting UE 115 may use for sidelink transmissions. The second stage SCI 240 may thereby be received and decoded by sidelink UEs 115 intended to receive and decode the corresponding sidelink communications. In some aspects, the second stage SCI 240 may include one or more bit fields that may indicate one or more parameters for locating the resources that are to be used for decoding the PSSCH 230. For example, the second stage SCI 240 may include a HARQ identifier (ID), a HARQ enable or disable bit, a new data indicator (NDI), a redundancy version (RV) ID, a source ID, a destination ID, or a combination thereof.

Figure 3:
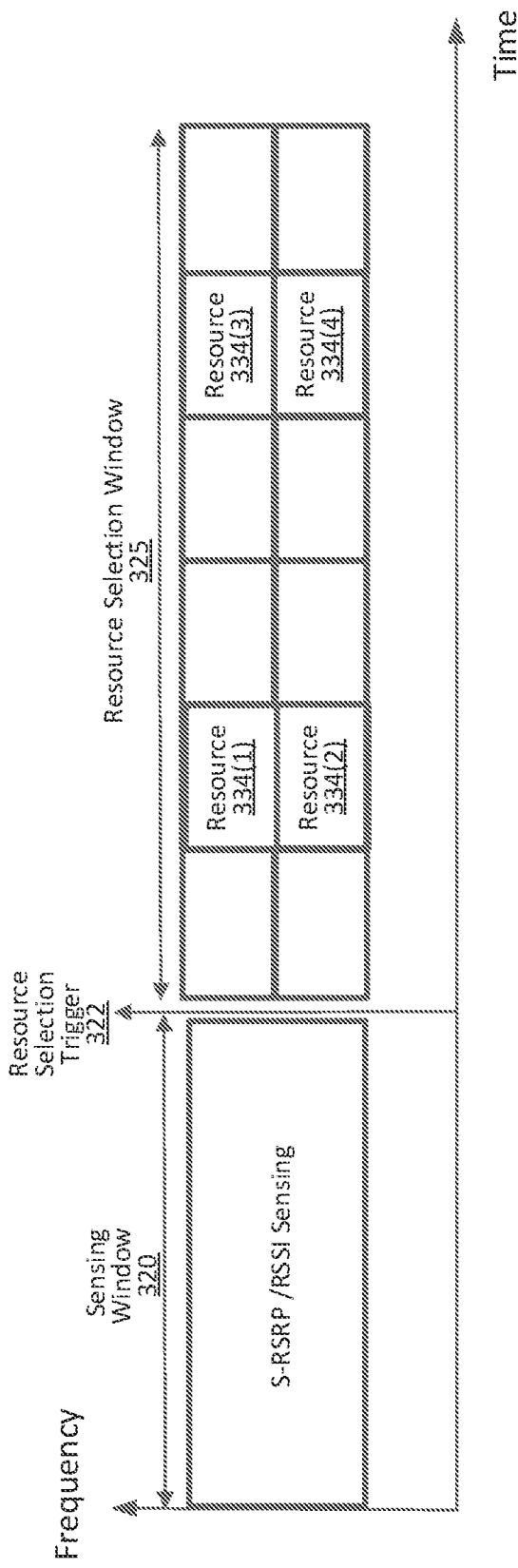
FIG. 3 illustrates sidelink resource selection according to some aspects of the present disclosure.

FIG. 3 illustrates sidelink resource selection according to some aspects of the present disclosure. In FIG. 3, the x-axis represents time in some arbitrary units and the Y-axis represents frequency in some arbitrary units. In some instances, when a UE decides to select new resources for its transmission, the UE may use a sensing-based resource selection method. This may include estimating which resources are in-use by other UEs using the resource reservation field information included in the SCIs received by the UE. Resource selection decisions may also be based on channel sensing. For example, the UE may measure sidelink reference signal received power (S-RSRP), SINR, and/or received signal strength indicator (RSSI) within the sensing window 320 for one or more frequencies. The UE may select resources from candidate resources within the resource selection window 325.

The resource selection trigger 322 may be the time when the UE decides to select new resources from among the candidate resources. Within the resource selection window 325, the UE identifies all or some of the candidate resources. A candidate resource may include a number of adjacent subchannels in which the transport block to be transmitted by the UE may fit. A PHY layer of the UE may report the candidate resources to a MAC layer of the UE. The MAC layer may select the required resources from the candidate resources. In some aspects, the PHY layer of the UE may report measurements associated with the candidate resources to a MAC layer of the UE as described below with reference to FIG. 7

When a transport block needs to be transmitted, the sensing window 320 may be utilized to determine which resources are used by other UEs and/or likely to be used by other UEs. In some instances, the UE may exclude candidate resources from the resource selection window 325 that are used by other UEs and/or likely to be used by other UEs. The UE may also exclude resources having a measured RSRP higher than a threshold. In some instances, after excluding some candidate resources based on one or more of these conditions, the number of remaining candidate resources should satisfy a threshold (e.g., 10%, 20%, 25%, 50%, or other suitable percentage or number of the available candidate resources). If the threshold is not satisfied, then the RSRP threshold may be reduced and/or other evaluating parameter(s) may be changed and additional candidate resources may be identified. For example, the UE may identify resources 334(1) and 334(4) as having a measured RSRP higher than an initial threshold and identify resources 334(2) and 334(3) as having a measured RSRP higher than a reduced threshold, less than the initial threshold. In some aspects, the UE may identify candidate resources that have the lowest average RSSI measured in the sensing window 320. In some cases (e.g., heavy loading on the wireless network, low latency data, or other conditions) the UE may need to select candidate resources based on the reduced RSRP threshold in order to be able to identify resources to transmit the transport block. In some instances, the UE may select candidate resources based on the size of the transport block and/or associated data to be transmitted. For example, in some instances, the transport block may include control messages that will fit in a smaller number of resources than mobile broadband traffic that may require a larger number of resources. In order to increase the spectral efficiency and throughput of the wireless network, the UE may use the sensing measurements described above to transmit the SCI associated with the resources in a frequency that is selected to have a low interference level. The SCI can include critical information for the correct reception of the transport block. A transport block may not be decoded properly if the associated SCI is not received correctly.

FIGS. 4A and 4B illustrate sidelink resource selection based on an interference condition according to some aspects of the present disclosure. In FIGS. 4A and 4B, the x-axis represents time in some arbitrary units and the Y-axis represents frequency in some arbitrary units. FIGS. 4A and 4B illustrate sidelink resources in a wireless communication network (such as wireless communication networks 100 and/or 200) according to aspects of the present disclosure. The UE 115a and the UE 115b of FIGS. 4A and 4B may correspond to the UEs 115 in the wireless communication networks 100 and/or 200.

In some aspects, a UE may transmit the SCI in a PSCCH located in a resource having a default location. In other words, the UE may be configured to transmit the SCI in a subchannel that is determined by a default configuration. For example, the default configuration may be defined by a wireless communications standard (e.g., 3GPP standard, ITU standard, IEEE standard, etc.). The default configuration may require the SCI to be transmitted in a subchannel having a leading index. However, aspects of the present disclosure include methods of selecting a subchannel (e.g., one or more frequencies, a frequency band, a range of frequencies) to transmit the SCI based on interference conditions rather than a default location (e.g., a default subchannel index, a leading subchannel index). Although the resources 430 are shown as a plurality of contiguous subchannels in FIGS. 4A and 4B, the present disclosure is not so limited. The resources 430 may include any number of subchannels configured as contiguous and/or non-contiguous subchannels. By selecting a subchannel to transmit the SCI that has a lower interference level than the default subchannel, the reliability of the SCI decoding by a receiving UE may be increased and, therefore, the successful transmission, reception, and/or decoding of the associated transport block(s) may be increased.

FIG. 4A shows resource allocations for UE 115a and UE 115b. For example, UE 115a may be configured with resources 430(1). The resources 430(1) may include PSCCH 434(1) in default sidelink subchannel 432. Default sidelink subchannels 432(1) and 432(2) may be located in a predefined or default location (e.g., a default subchannel index, a leading subchannel index). In some aspects, default sidelink subchannel 432(1) may be a frequency that has interference conditions that allow the SCI carried in PSCCH 434(1) to be reliably decoded by a receiving UE. FIG. 4A also shows UE 115b configured with resources 430(2). The resources 430(2) may include PSCCH 434(2) in default sidelink subchannel 432(2). However, in contrast to UE 115a, the default sidelink subchannel 432(2) for UE 115b may be subject to high interference conditions in the channel such that the SCI carried in PSCCH 434(2) may not be reliably decoded by a receiving UE as indicated by the X in the PSCCH 434(2) location. In some aspects, different UEs 115 or groups of UEs 115 may have different default subchannels 432 and/or the same default subchannel 432. As described below with reference to FIG. 4B, the present disclosure does not restrict the UEs 115 to carrying the SCI in the default subchannel 432. The subchannel to carry the SCI may be selected based on interference conditions associated with the resources 430.

In some aspects, the interference conditions may be sensed by UE 115a and UE 115b in a NR SL mode 2. In some aspects, the interference conditions may be sensed by a BS in communication with UE 115a and UE 115b in NR SL mode 1. The interference conditions may be determined by the UEs 115a, 115b and/or the BS as described above with reference to FIG. 3. As will be described with reference to FIG. 4B, aspects of the present disclosure can include selecting a subchannel to transmit the SCI based on interference conditions in order to increase the reliability of SCI decoding in receiving UEs.

FIG. 4B shows resource allocations for UE 115a and UE 115b. In contrast to the default PSCCH/SCI resource allocations in FIG. 4A, the PSCCH/SCI resource allocations in FIG. 4B are frequency selected based on interference conditions. For example, interference conditions may be determined for multiple frequencies by UE 115a, UE 115b, and/or a BS in communication with UEs 115a, 115b. In one aspect, UE 115a may sense interference levels of different frequencies and select a frequency in which the interference level satisfies a threshold. For example, UE 115a may sense the interference levels in resources 430(1) and select subchannel 438 for transmitting SCI 436(1). Subchannel 438 may have an interference level satisfying the threshold. In another example, UE 115b may sense the interference levels in resources 430(2) and select subchannel 432 for transmitting SCI 436(2). Subchannel 432 may have an interference level satisfying the threshold. In some instances, the UE 115a and/or UE 115b may select a subchannel having the lowest level of measured interference in order to increase the probability of successful decoding of the SCI 436 by a receiving UE. In some aspects, a PHY layer of the UE 115 may receive a request from a MAC layer of the UE 115 to sense interference levels in order to find a set of available candidate subchannels using the default DMRS RSRP threshold. If the number of available candidate subchannels satisfying the default DMRS RSRP threshold exceeds a candidate threshold, the PHY layer may report the set of available candidate subchannels that satisfy the default DMRS RSRP threshold to the MAC layer. If the candidate threshold is not met, the PHY layer may relax the DMRS RSRP threshold to include additional subchannels in the set of available candidate subchannels. In this regard, the PHY layer may differentiate the interference levels among the available subchannels with respect to the DMRS RSRP.

Figure 5A:
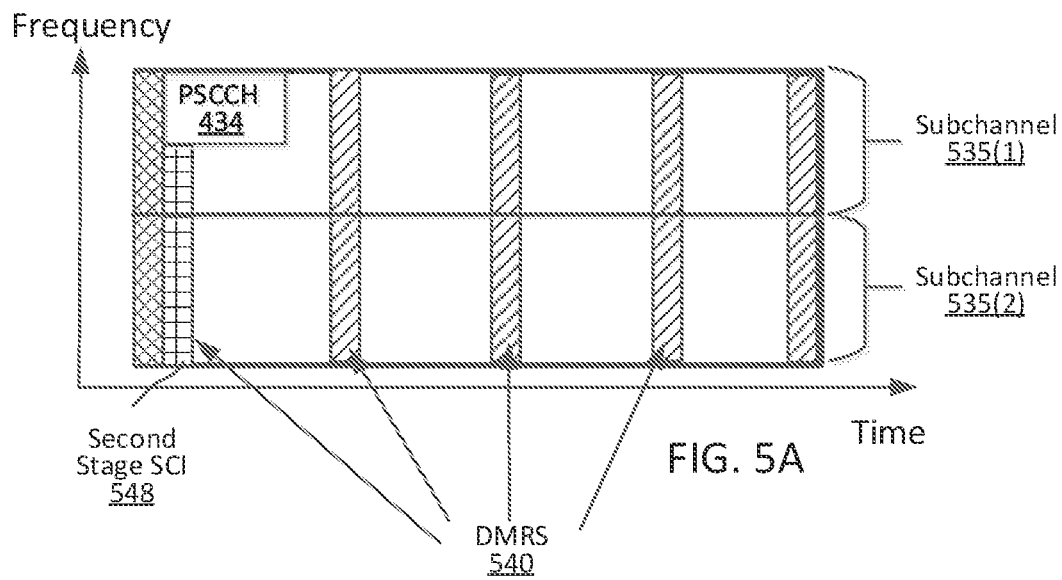
FIGS. 5A and 5B illustrate sidelink control information configured in a subchannel according to some aspects of the present disclosure.
Figure 5B:
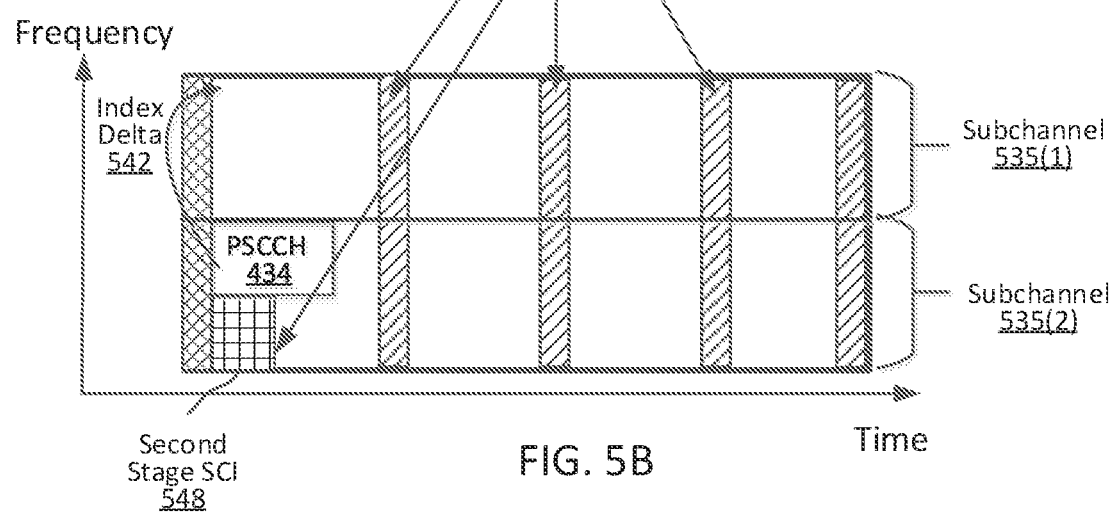

FIGS. 5A and 5B illustrate sidelink control information configured in a range of frequencies (e.g., band, channel, subchannel, etc.) according to some aspects of the present disclosure. In FIGS. 5A and 5B, the x-axis represents time in some arbitrary units and the Y-axis represents frequency in some arbitrary units. In some aspects, a PSSCH 550 may occupy multiple subchannels. For example, a transport block may be a carried in a PSSCH 550 that occupies a plurality of subchannels (e.g., 2, 3, 4, or more subchannels). FIG. 5A shows an instance where the PSSCH 550 occupies subchannels 535(1) and 535(2). Although FIGS. 5A and 5B show a PSSCH 550 occupying two subchannels 535(1) and 535(2), the present disclosure is not so limited and any number of subchannels may be occupied by a PSSCH 550.

In FIG. 5A, the first stage SCI may be carried by PSCCH 434. PSCCH 434 may occupy a resource block in subchannel 535(1). Subchannel 535(1) may be the leading subchannel of a plurality of subchannels that includes subchannels 535(1) and 535(2). The leading subchannel can be the first subchannel (or the last subchannel) of a plurality of subchannels in a group of subchannels, based on frequency location. In some aspects, the PSCCH 434 may occupy a resource block in subchannel 535(1) based on a predefined and/or default rule or configuration. The predefined and/or default rule or configuration may be defined by a communication standard. In contrast, as will be described with reference to FIG. 5B, the subchannel occupied by PSCCH 434 in FIG. 5B may be selected based on the interference conditions associated with subchannels 535(1) and 535(2). As shown in FIG. 5A, the second stage SCI 548 may occupy a resource block that includes resource elements across multiple subchannels 535(1) and 535(2). Subchannels 535(1) and 535(2) may further include DMRS 540 used for channel estimation by the receiving UEs and compensating for Doppler effects at high UE speeds. In some aspects, DMRS 540 may occupy one or more symbols in subchannels 535(1) and 535(2). For example, the DMRS 540 may occupy the 3rd, 6th, 9th, and $12^{th}$ symbols in the subchannels 535(1) and 535(2). In other instances, the DMRS 540 may occupy other symbols in the subchannels 535(1) and 535(2). In some instances, the second stage SCI 548 may include the DMRS 540.

FIG. 5B shows a PSSCH 550 occupying multiple subchannels 535(1) and 535(2). The PSSCH 550 may comprise multiple subchannels 535(1) and 535(2) to carry a larger transport block. In FIG. 5B the first stage SCI may be carried by PSCCH 434. PSCCH 434 may occupy a resource block in subchannel 535(2). Subchannel 535(2) may be selected to carry the SCI in PSCCH 434 based on the interference conditions associated with subchannels 535(1) and 535(2). For example, the UE and/or a BS in communication with the UE may sense the interference conditions in subchannels 535(1) and 535(2) and select the subchannel with the lowest interference to carry the first stage SCI in PSCCH 434. Although FIG. 5B shows two subchannels 535(1) and 535(2), the present disclosure is not so limited and any number of subchannels may be sensed to determine interference conditions and a subchannel to carry the first stage SCI may be selected from among the subchannels sensed for interference conditions. For example, the subchannels 535(1) and 535(2) may be sensed to estimate the highest SINR among subchannels 535(1) and 535(2).

In contrast to FIG. 5A, FIG. 5B shows the second stage SCI 548 carried in resource elements within the same subchannel 535(2) as the first stage SCI carried in PSCCH 434. In this regard, the second stage SCI 548 may occupy a larger number of symbols as compared to the number of symbols occupied by the second stage SCI 548 in FIG. 5A. For example, when the first stage SCI and the second stage SCI 548 occupy the same subchannel 535(2), the second stage SCI may occupy 2, 3, or more consecutive symbols. In some instances, the second stage SCI 548 and/or the PSCCH 434 may include the DMRS 540. The DMRS 540 may be used for channel estimation by the receiving UEs and compensating for Doppler effects at high UE speeds. In some aspects, DMRS 540 may occupy one or more symbols in subchannels 535(1) and 535(2). For example, the DMRS 540 may occupy the 3rd, 6th, 9th, and 12th symbols in the subchannels 535(1) and 535(2). In other instances, the DMRS 540 may occupy other symbols in the subchannels 535(1) and 535(2). In some instances, the second stage SCI 548 may include the DMRS 540.

FIG. 5B shows the PSCCH 434 (carrying the first stage SCI) and the second stage SCI 548 within a common subchannel 535(2) that is selected based on the interference conditions associated with subchannels 535(1) and 535(2). In this regard, aspects of the present disclosure may increase the probability of a receiving UE to successfully decode the first stage SCI, the second stage SCI, and the transport block carried by the associated PSSCH 550, thereby increasing the reliability and communication bandwidth between the UEs and the network as a whole.

As described above, the PSCCH 434 may carry the first stage SCI within the subchannel 535(2) that is selected based on the interference conditions. In some aspects, the transmitting UE may transmit an indicator to the receiving UE that indicates a starting frequency and/or a starting subchannel of a first resource of a multi-subchannel PSSCH 550. For example, the PSCCH 434 may include the indicator as an index delta 542 between a subchannel index associated with the selected subchannel 535(2) and an index associated with the starting subchannel of the PSSCH 550. In the example, of FIG. 5B, the index of the selected subchannel 535(2) may be 2 and the index of the starting subchannel 535(1) of the PSSCH 550 may be 1. In this case the index delta 542 will be 1. The PSCCH 434 may carry the index delta 542 to indicate to the receiving UE(s) the subchannel in which the PSSCH 550 begins. The index delta 542 may include a number of bits. For example, the number of bits in index delta 542 may be up to $\log_2 (N_{SLsubchannel}-1)$, where $N_{SLsubchannel}$ is the number of subchannels of the resource pool. In some aspects, the number of bits may be limited by configuring a maximum index delta 542 allowed in a resource pool. For example, a layer 3 function may configure RRC parameters to limit the index delta 542 to a maximum allowable number. In some aspects, the maximum allowable number for the index delta 542 may be limited by the number of bits available in the PSSCH to indicate the index delta 542. In some aspects, the maximum allowable number for the index delta 542 may be defined by a wireless communications standard (e.g., 3GPP standard, ITU standard, IEEE standard, etc.).

In some aspects, the index delta 542 may be carried in a message by the PSCCH 434. The index delta 542 may be carried in any field of the PSCCH. For example, the PSCCH may carry fields associated with reservation of resources for transmission or retransmission of a transport block. A UE may reserve resources for future transmissions or re-transmissions of transport blocks. For example, the UE may reserve one or more sub-channels for the transmission of a transport block using the resource reservation interval (RRI) included in the SCI. The first stage SCI may indicate the frequency resources (e.g., sub-channels) of the PSSCH 550 carrying the resource reservation for further retransmissions of the transport block. The number of resource reservations for retransmission(s) of the transport block may be limited (e.g., 1, 2, 3, 4, etc. retransmissions). The PSCCH field(s) may include frequency resource assignments for the reserved resources. In some aspects, the frequency resource assignments may be re-purposed to include the index delta 542. For example, when the maximum number of reserved resources is 2 (sl-MaxNumPerReserve=2), the frequency domain resource allocation (FDRA) may include the index delta 542 and retain the maximum number of resources at 2. When the maximum number of reserved resources is 3 (sl-MaxNumPerReserve=3), the frequency domain resource allocation (FDRA) may include the index delta 542. However, in this case, the maximum number of reserved resources may be reduced from 3 to 2. In some aspects, the re-purposing of frequency resource assignments to include the index delta 542 for indicating a subchannel for PSSCH 550 (e.g., a starting subchannel, an ending subchannel, or otherwise) may be indicated in the PSCCH 434. For example, one bit in the PSCCH may be assigned to indicate whether the frequency resource assignments include the index delta 542. While reducing the maximum number of reserved resources from 3 to 2 may reduce the opportunity for retransmission of a transport block that is not successfully decoded by a receiving UE, the overall reliability of the communications may be increased by communicating the SCI and associated data in a subchannel with a lower interference level.

Figure 6A:
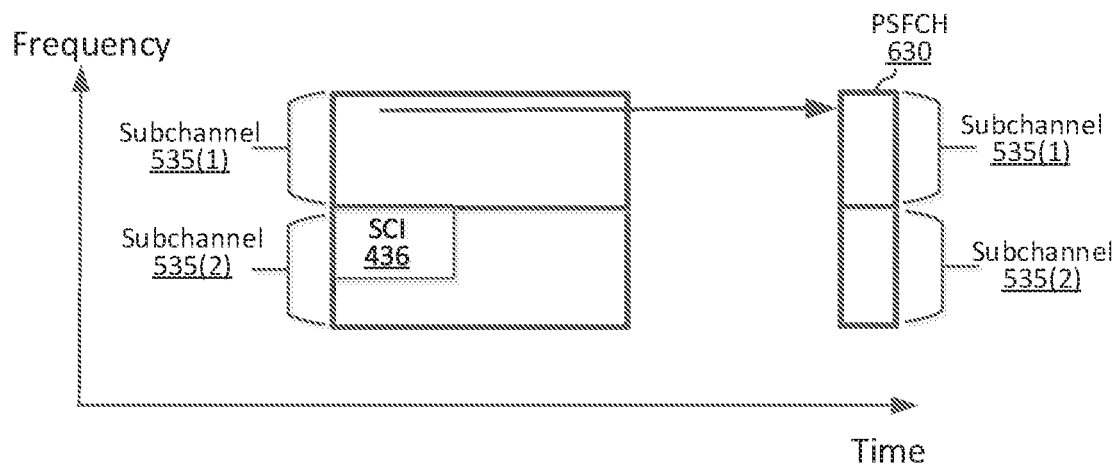
FIGS. 6A, 6B, and 6C illustrate resources associated with a physical sidelink feedback channel according to some aspects of the present disclosure.
Figure 6B:
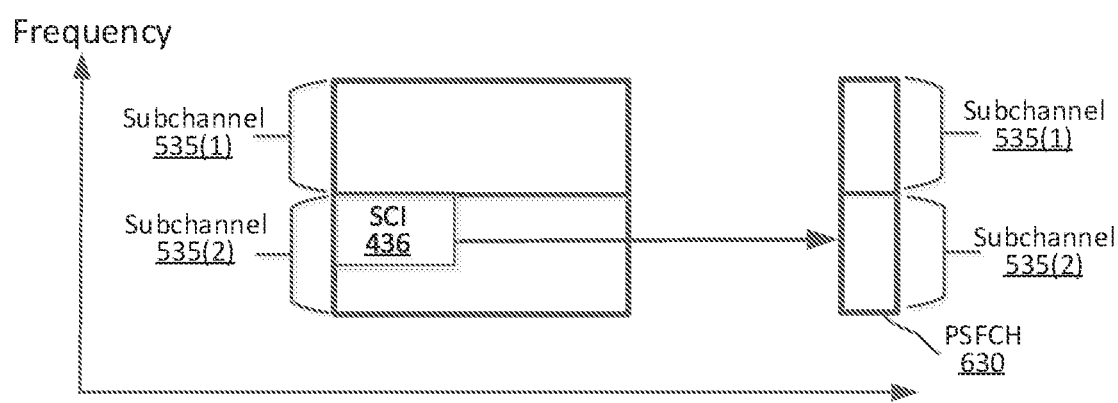
Figure 6C:
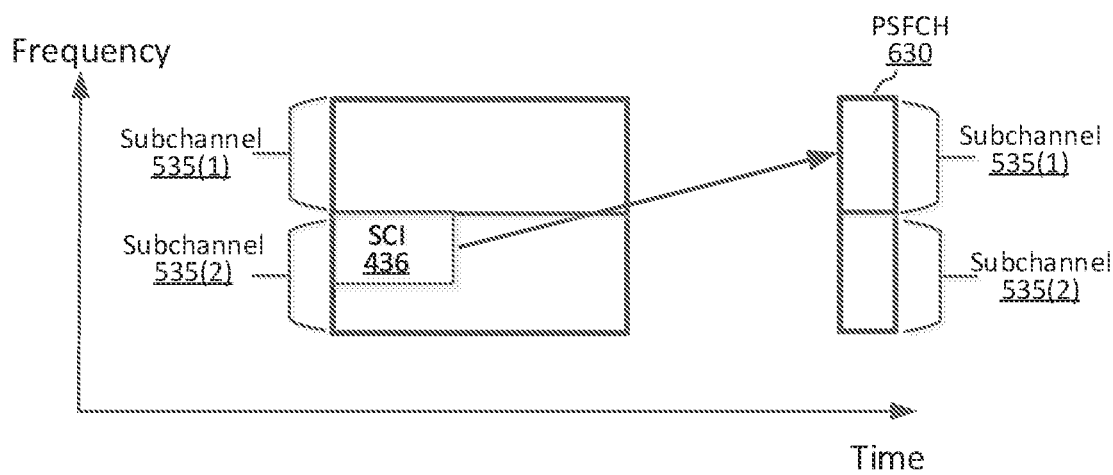

FIGS. 6A, 6B, and 6C illustrate resources associated with a physical sidelink feedback channel (PSFCH) 630 according to some aspects of the present disclosure. In FIGS. 6A, 6B, and 6C, the x-axis represents time in some arbitrary units and the Y-axis represents frequency in some arbitrary units. In some aspects, a PSFCH may carry the HARQ feedback from a receiving UE(s) (e.g., the UEs 115) to a transmit UE (e.g., the UEs 115). Within a resource pool, the resources for the PSFCH may be configured periodically (e.g., configured with a period of 1, 2, or 4 slots). In some aspects, the PSFCH may be transmitted in one symbol among the last SL symbols in a slot. The receiving UE(s) may transmit the HARQ feedback on the PSFCH in response to a unicast or groupcast transmission carried in a PSSCH 550.

FIGS. 6A, 6B, and 6C each illustrate different resource locations for the PSFCH according to aspects of the present disclosure. As shown in FIG. 6A, when the PSSCH 550 is configured for subchannels 535(1) and 535(2), the SCI 436 may be carried in a PSCCH that is located in a subchannel based on the interference level of the subchannels 535(1) and 535(2). In FIG. 6A, the SCI 436 is carried in a PSCCH in subchannel 535(2). However, the PSFCH 630 is carried in subchannel 535(1). In the example of FIG. 6A, the subchannel 535(1) may be a leading subchannel and the PSFCH may be located in the leading subchannel 535(1) based on a default configuration.

As shown in FIG. 6B, when the PSSCH 550 is configured for subchannels 535(1) and 535(2), the SCI 436 may be carried in a PSCCH that is located in a selected subchannel based on the interference level of the subchannels 535(1) and 535(2). In FIG. 6B, the SCI 436 is carried in the PSCCH in subchannel 535(2). Subchannel 535(2) may have a lower interference level than subchannel 535(1). In some aspects, the PSFCH 630 may be carried in the same subchannel 535(2) as the SCI 436. In this regard, carrying the PSFCH in the subchannel having the lower interference level may increase the reliability of the receiving UEs transmission of PSFCH 630 to the transmitting UE.

As shown in FIG. 6C, when the PSSCH 550 is configured for subchannels 535(1) and 535(2), the SCI 436 may be carried in a PSCCH that is located in a subchannel based on the interference level of the subchannels 535(1) and 535(2). In FIG. 6C, the SCI 436 is carried in the PSCCH in subchannel 535(2). Similar to FIGS. 6A and 6B, subchannel 535(2) may have a lower interference level than subchannel 535(1). However in FIG. 6C, the PSFCH 630 may be carried in a subchannel that is pointed to by a field in the SCI. For example, SCI 436 may include a field that contains the index of the subchannel for carrying the PSFCH 630. In the example of FIG. 6C, the SCI 436 may include a field that points to subchannel 535(1) for carrying PSFCH 630. Although, the examples shown in FIGS. 6A, 6B, and 6C show 2 subchannels, the present disclosure is not so limited, and the methods described may be extended to any number of subchannels.

Figure 7:
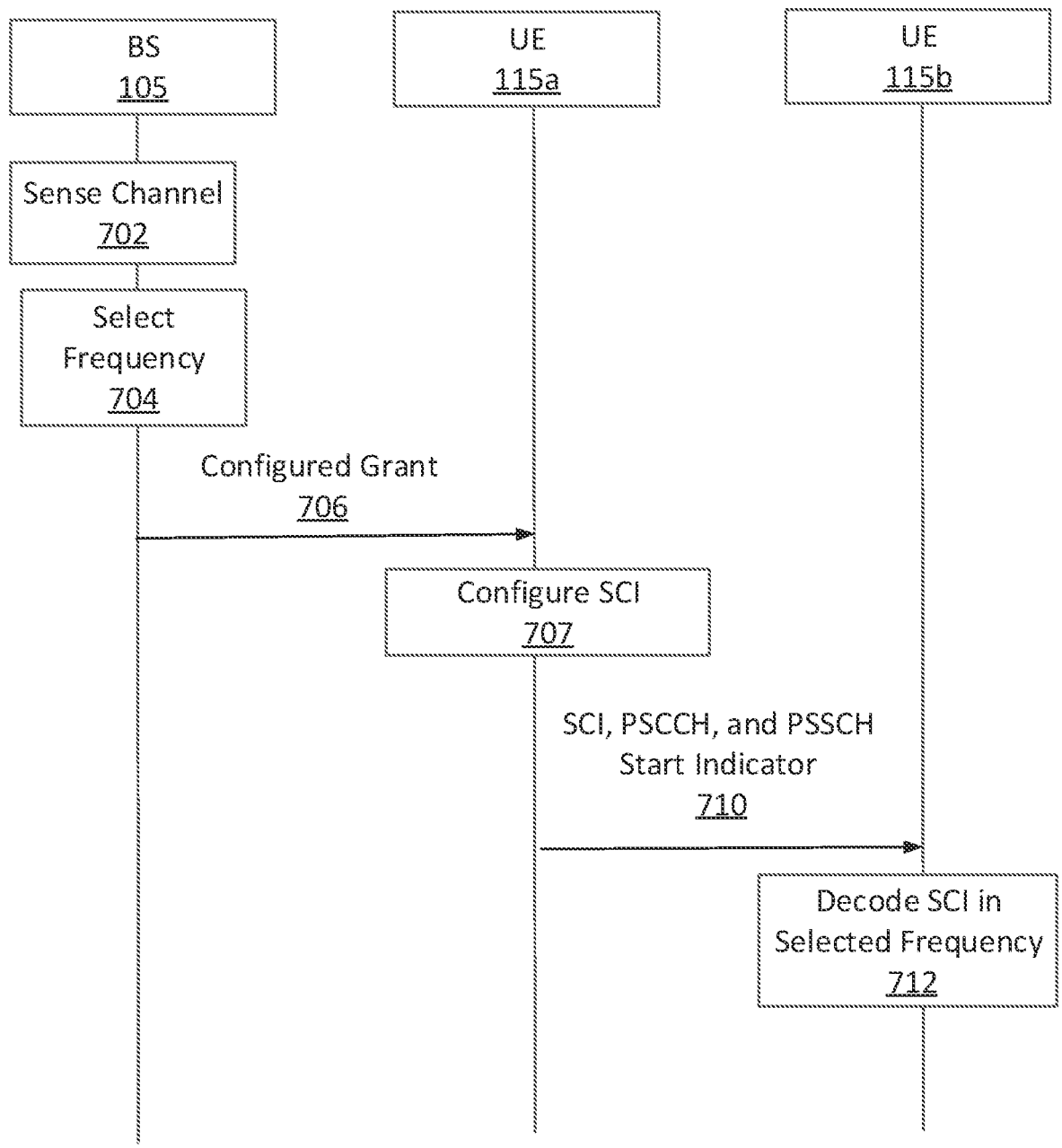
FIG. 7 is a signaling diagram illustrating a wireless communication method according to aspects of the present disclosure.

FIG. 7 is a signaling diagram illustrating a wireless communication method 700 according to aspects of the present disclosure. The method 700 may be employed by the network 100 for selection of a frequency for communicating SCI. Aspects of the method 700 may be implemented by a BS 105 that serves UE 115*a* and/or UE 115*b*. The BS 105 may correspond to BS 105 in the network 100. The UE 115*a* and the UE 115*b* may correspond to the UE 115*a* and the UE 115*b* respectively in the network 100. Aspects of the method 700 may be executed by computing devices (e.g., a processor, processing circuit, and/or other suitable component) of the BS 105, the UE 115*a*, and/or the UE 115*b*. As illustrated, the method 700 includes a number of enumerated steps, but the method 700 may include additional steps before, after, and in between the enumerated steps. In some instances, one or more of the enumerated steps may be omitted or performed in a different order.

At 702, the BS 105 may sense a communication channel. The BS 105 may sense a communication channel using any method. For example, the BS 105 may measure RSRP, SINR, and/or RSSI within a sensing window. During the sensing window, the BS 105 may sense the channel to determine a level of interference within a range of frequencies.

At 704, the BS 105 may identify candidate frequencies that have the lowest level of interference measured in the sensing window. In order to increase the spectral efficiency and throughput of the wireless network, the BS 105 may use the sensing measurements described above to select a frequency that has a low interference level. In some aspects, the frequency may be selected cooperatively between BS 105 and UE 115*a*. For example, the BS 105 may select a set of candidate frequencies. The set of candidate frequencies may be selected based on the level of interference within those frequencies satisfying a threshold. The BS may transmit an indication to the UE that includes the set of candidate frequencies. In this regard, the UE may consider the set of frequencies as candidate frequencies for transmitting the SCI. The UE may sense the interference level of the set of frequencies and select a single frequency that satisfies an interference level threshold. In this regard, the UE may select a single subchannel of frequencies having the lowest interference level and transmit the SCI in the selected single frequency. In this case, the UE may obtain a more accurate interference level measurement of the channel than the interference level measurements performed by the BS.

At 706, the BS 105 may transmit a configured grant to the UE 115*a*. The configured grant may include downlink control information (DCI). For example, the BS 105 may transmit an indicator of the selected frequency via a DCI message to the UE 115*a*. The DCI message may be a DCI 3-0 message. In some aspects, the selected frequency indicator may be transmitted as a subchannel index. In some aspects, the BS 105 may transmit an indicator of a set of selected frequencies to the UE 115*a* as a set of subchannel indices. The set of subchannel indices may include all the subchannels granted to the UE 115 by the BS 105. The DCI may include the indicator of the frequency or the set of frequencies selected for communication of the SCI based on interference levels. The indicator may be a subchannel index or set of subchannel indices for communicating the SCI. In the case of the BS 105 transmitting a set of candidate subchannel indices, the UE 115*a* may select the subchannel from the set of candidate subchannels at 708.

In some aspects, the BS 105 may configure the grant such that the SCI configuration for UE 115*a* is orthogonal to the SCI configuration provided by the BS 105 to other UEs while the PSSCHs may partially overlap based on the size of respective transport blocks to be carried in a configured grant transmission occasion. In some aspects, in order to reduce overlapping of subchannels in PSSCH, the BS 105 may configure UE 115*a* to use subchannels with different indices than those configured for other UEs.

At 708, the UE 115*a* configures the SCI for transmission. In the case in which the BS 105 communicates a single selected subchannel index to the UE 115*a* for SCI communication, the UE 115*a* may configure the SCI for transmission in the subchannel selected by the BS 105. In the case in which the BS communicates a plurality of selected candidate subchannels, the UE 115 may select single subchannel for SCI communication from the set of candidate subchannels based on interference levels of the candidate subchannels. A physical layer of the UE 115*a* may perform interference level measurements on the set of candidate subchannels. The physical layer of the UE 115*a* may provide the interference level measurements to a processor of the UE 115*a*. The processor may execute code to compare the interference levels to a threshold. The processor may select the single subchannel for SCI communication from the set of candidate subchannels based on the interference level satisfying the threshold. For example, the UE 115*a* may select the single subchannel for SCI communication from the set of candidate subchannels using the methods described above with reference to FIG. 3. In some aspects, the UE 115*a* may provide the set of candidate frequencies and interference measurements to a MAC layer of the UE 115*a*. The MAC layer may then select the frequency based at least on the physical layer interference measurements.

At 710, the transmitting UE 115*a* may transmit the SCI in a PSCCH at the selected frequency. The selected frequency may include a single subchannel. The transmitting UE 115*a* may also transmit an indicator indicating the starting subchannel for the PSSCH as described above with reference to FIG. 5B. In some aspects, the first stage SCI, the second stage SCI, and/or the DMRS may be transmitted within the same selected subchannel.

At 712, the receiving UE 115*b* may decode the SCI in the selected frequency. The receiving UE 115*b* may scan a search space of multiple subchannels that include the selected subchannel attempting to decode the SCI in the selected subchannel. When the receiving UE 115*b* successfully decodes the first stage SCI, the receiving UE 115*b* may determine the PSSCH DRMS sequence according to the FDRA of the PSSCH that spans multiple sub-channels. The receiving UE 115*b* may then demodulate and decode the second stage SCI in the selected subchannel. In some aspects, the second stage SCI may be rate matched after the first PSSCH DMRS. However, the rate matching may be limited to the resource elements in the same selected subchannel as the PSCCH.

Figure 8:
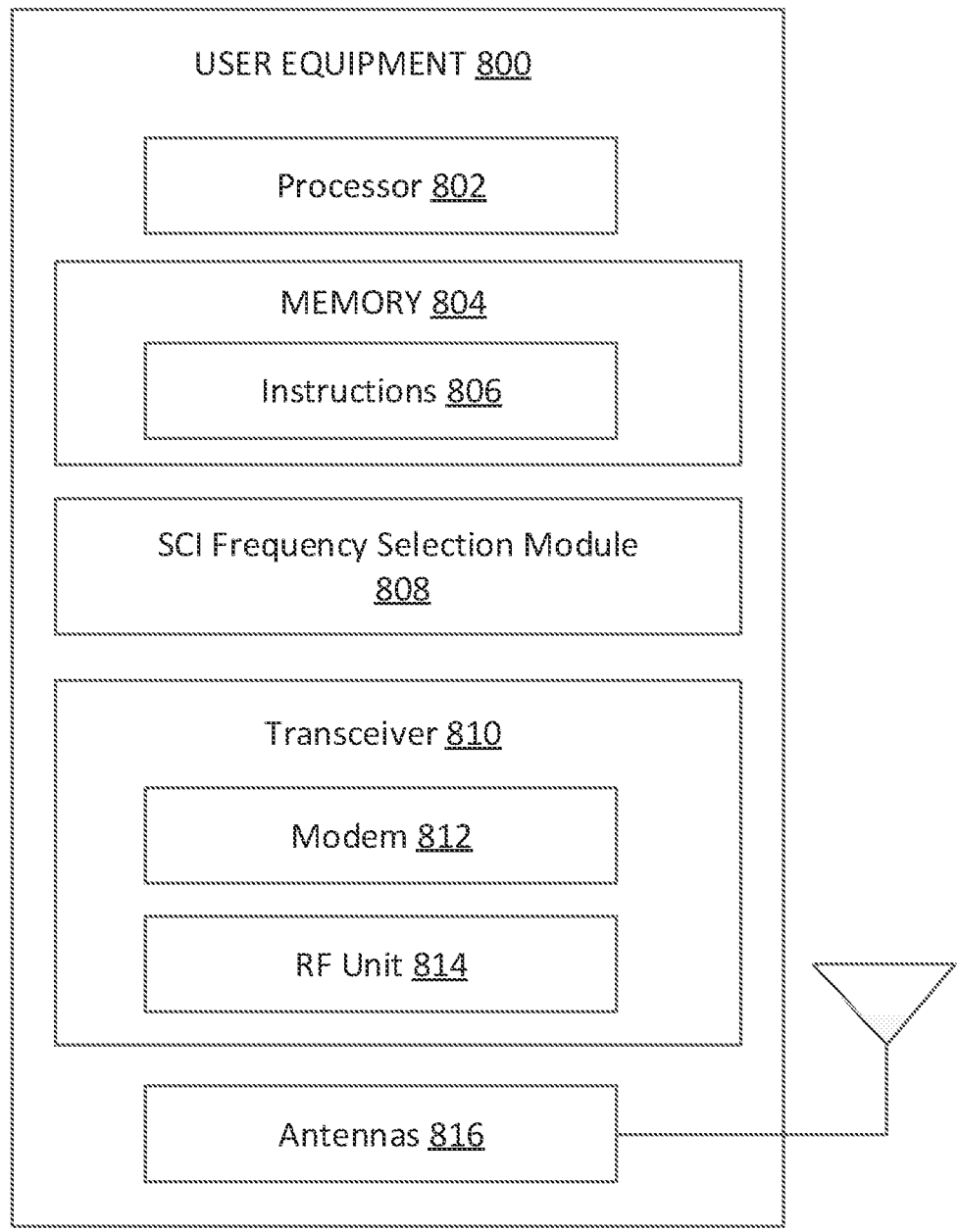
FIG. 8 is a block diagram of an exemplary user equipment (UE) according to some aspects of the present disclosure.

FIG. 8 is a block diagram of an exemplary UE 800 according to some aspects of the present disclosure. The UE 800 may be the UE 115 in the network 100 as discussed above. As shown, the UE 800 may include a processor 802, a memory 804, an SCI frequency selection module 808, a transceiver 810 including a modem subsystem 812 and a radio frequency (RF) unit 814, and one or more antennas 816. These elements may be coupled with each other and in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 804 includes a non-transitory computer-readable medium. The memory 804 may store instructions 806. The instructions 806 may include instructions that, when executed by the processor 802, cause the processor 802 to perform the operations described herein with reference to the UEs 115 in connection with aspects of the present disclosure, for example, aspects of FIGS. 2-7 and 10-11. Instructions 806 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SCI frequency selection module 808 may be implemented via hardware, software, or combinations thereof. For example, the SCI frequency selection module 808 may be implemented as a processor, circuit, and/or instructions 806 stored in the memory 804 and executed by the processor 802.

The SCI frequency selection module 808 may be used for various aspects of the present disclosure, for example, aspects of FIGS. 2-7 and 10-11. The SCI frequency selection module 808 is configured to sense an interference level of at least one frequency and select, based on the interference level, a frequency for communicating the SCI. In some aspects, the transceiver 810 may sense the interference level of multiple candidate frequencies. The interference level may be based on a signal-plus-interference to noise ratio (SINR) associated with the candidate frequencies. The processor 802 may execute instructions 806 to determine whether the interference level satisfies a threshold and select a frequency with the lowest interference level for communicating the SCI. The transceiver 810 may determine an estimated gain associated with transmitting the SCI over the candidate frequencies and select the frequency further based on the estimated gain associated with transmitting the SCI over the candidate frequencies. In some aspects, the UE 800 may provide the interference levels of the candidate frequencies to a MAC layer of the UE 800. The MAC layer may select the frequency for communicating the SCI based on the interference levels. The selected frequency may include a single subchannel. The transceiver 810 may communicate a PSCCH carrying the SCI in the selected frequency. The transceiver 810 may further communicate an indicator in the selected frequency that indicates a first resource of a PSSCH. The indicator may be included in the SCI. The indicator may be a delta between an index associated with the selected frequency and an index associated with a first resource of the PSSCH.

As shown, the transceiver 810 may include the modem subsystem 812 and the RF unit 814. The transceiver 810 can be configured to communicate bi-directionally with other devices, such as the BSs 105 and/or the UEs 115. The modem subsystem 812 may be configured to modulate and/or encode the data from the memory 804 and the SCI frequency selection module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The antennas 816 may include multiple antennas of similar or different designs in order to sustain multiple transmission links. The RF unit 814 may configure the antennas 816.

In some instances, the UE 800 can include multiple transceivers 810 implementing different RATs (e.g., NR and LTE). In some instances, the UE 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the SCI frequency selection module 808, and/or the transceiver 810. The processor 802 and may execute operating system (OS) code stored in the memory 804 in order to control and/or coordinate operations of the SCI frequency selection module 808 and/or the transceiver 810. In some aspects, the processor 802 may be implemented as part of the SCI frequency selection module 808. In some aspects, the processor 802 is configured to transmit via the transceiver 810, to another UE, the SCI in the selected frequency.

Figure 9:
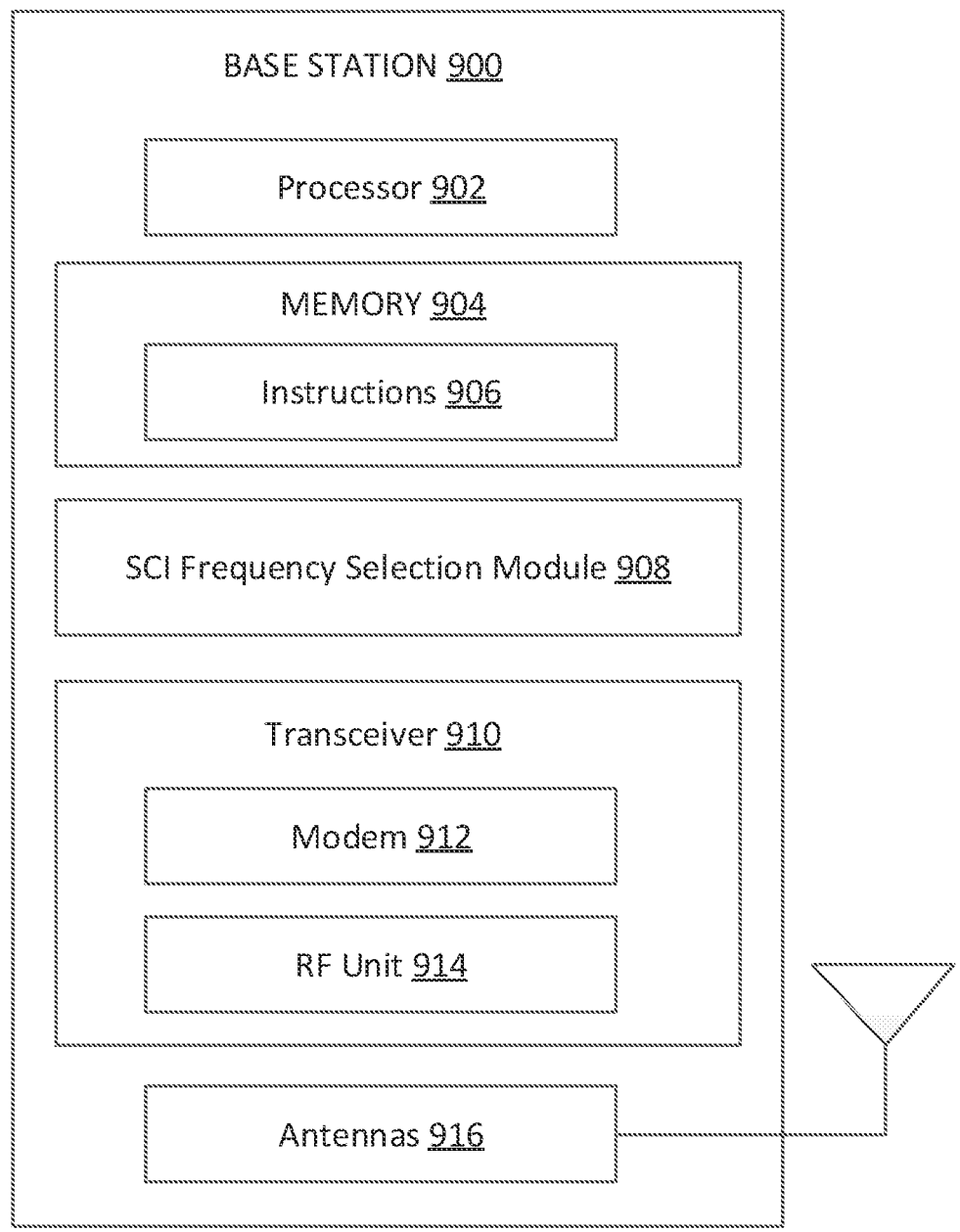
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 as discussed above. As shown, the BS 900 may include a processor 902, a memory 904, a SCI frequency selection module 908, a transceiver 910 including a modem subsystem 912 and a RF unit 914, and one or more antennas 916. These elements may be coupled with each other and in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 2-7 and 10-11. Instructions 906 may also be referred to as code, which may be interpreted broadly to include any type of computer-readable statement(s).

The SCI frequency selection module 908 may be implemented via hardware, software, or combinations thereof. For example, the SCI frequency selection module 908 may be implemented as a processor, circuit, and/or instructions 906 stored in the memory 904 and executed by the processor 902.

The SCI frequency selection module 908 may be used for various aspects of the present disclosure, for example, aspects of FIGS. 2-7 and 10-11. The SCI frequency selection module 908 is configured to sense an interference level of at least one frequency and select, based on the interference level, a frequency for communicating the SCI. The BS 900 may transmit an indication of the selected frequency to a UE (e.g., UE 115, UE 800). In some aspects, the transceiver 910 may sense the interference level of multiple candidate frequencies. The interference level may be based on a signal-plus-interference to noise ratio (SINR) associated with the candidate frequencies. The processor 902 may execute instructions 906 to determine whether the interference level satisfies a threshold and select a frequency or a set of frequencies with the lowest interference level. In some aspects, the transceiver 910 may determine an estimated gain associated with the channel and select the frequency further based on the estimated gain associated with the channel. The selected frequency may include a single subchannel. The BS 900 may transmit to the UE the indication of the selected frequency or set of selected frequencies for communicating the SCI. In this regard, the BS 900 may transmit indication of the selected frequency or set of selected frequencies to the UE via a configured grant. In some aspects, the frequency may be selected based on a level of resources associated with the configured grant. The transceiver 910 may transmit the indication of the selected frequency or set of frequencies for communicating the SCI via a DCI over a PDCCH.

Additionally or alternatively, the SCI frequency selection module 908 can be implemented in any combination of hardware and software, and may, in some implementations, involve, for example, processor 902, memory 904, instructions 906, transceiver 910, and/or modem 912.

As shown, the transceiver 910 may include the modem subsystem 912 and the RF unit 914. The transceiver 910 can be configured to communicate bi-directionally with other devices, such as the UEs 115 and/or 800. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 900 to enable the BS 900 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, transmission of an indicator of a selected frequency or a set of selected frequencies according to aspects of the present disclosure. The antennas 916 may further receive data messages transmitted from other devices and provide the received data messages for processing and/or demodulation at the transceiver 910. The antennas 916 may include multiple antennas of similar or different designs in order to sustain multiple transmission links.

In some instances, the BS 900 can include multiple transceivers 910 implementing different RATs (e.g., NR and LTE). In some instances, the BS 900 can include a single transceiver 910 implementing multiple RATs (e.g., NR and LTE). In some instances, the transceiver 910 can include various components, where different combinations of components can implement RATs.

In some aspects, the processor 902 may be coupled to the memory 904, the SCI frequency selection module 908, and/or the transceiver 910. The processor 902 may execute OS code stored in the memory 904 to control and/or coordinate operations of the SCI frequency selection module 908, and/or the transceiver 910. In some aspects, the processor 902 may be implemented as part of the SCI frequency selection module 908. In some aspects, the processor 902 is configured to transmit via the transceiver 910, to a UE, an indicator of a selected frequency or a set of frequencies.

Figure 10:
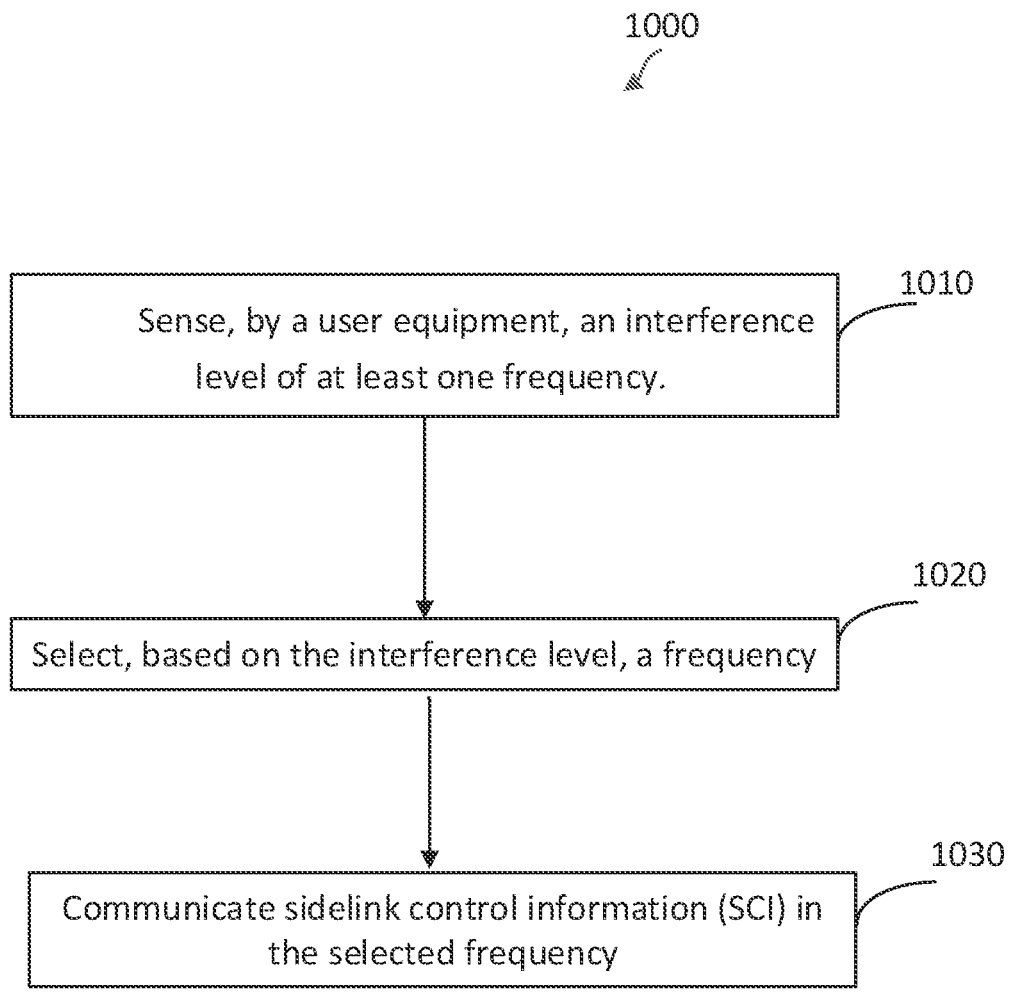
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115 or UE 800, may utilize one or more components, such as the processor 802, the memory 804, the SCI frequency selection module 808, the transceiver 810, the modem 812, and the one or more antennas 816, to execute aspects of method 1000. The method 1000 may employ similar mechanisms as in the networks 100 and 200 and the methods described with respect to FIGS. 2-7. As illustrated, the method 1000 includes a number of enumerated steps, but the method 1000 may include additional steps before, after, and in between the enumerated steps. In some instances, one or more of the enumerated steps may be omitted or performed in a different order.

At 1010, the method 1000 of wireless communication performed by a UE (e.g., the UEs 115 and 800) includes sensing, by the UE, an interference level of at least one range of frequencies (e.g., band, channel, subchannel, etc.). Sensing, by the UE, an interference level of at least one frequency may be performed as described above with reference to FIGS. 3-7. In some aspects, sensing, by the UE, an interference level of at least one range of frequencies may include sensing an interference level within a subchannel of frequencies. In this regard, the UE may measure sidelink RSRP, SINR, and/or RSSI within a window of time prior to transmitting the SCI.

At 1020, the method 1000 includes selecting a frequency based on the interference level sensed at 1010. In this regard, the UE may identify all or some of the candidate resources within a resource selection window. A candidate resource may include a number of adjacent and/or non-adjacent subchannels in which a transport block to be transmitted by the UE may fit. In some aspects, a PHY layer of the UE may measure and provide the interference levels of the candidate resources to a MAC layer of the UE. In this regard, the PHY layer may provide a bit map that indicates the interference level of the frequencies. The MAC layer may select the required resources from the candidate resources. In some aspects, when a transport block needs to be transmitted, the sensing window may be utilized to determine which resources are used by other UEs and/or likely to be used by other UEs. The UE may exclude candidate resources from the resource selection window that are used by other UEs and/or likely to be used by other UEs. In some aspects, the UE may select a frequency that has the lowest interference level measured in the sensing window.

At 1030, the method 1000 includes communicating SCI in the selected frequency. In this regard, the UE may communicate the SCI in a PSCCH in the selected frequency. The selected frequency may comprise a single sub-channel selected based on the level of interference associated with the subchannel. The subchannel having the lowest level of interference may be selected in order to increase the reliability of the communication of the SCI to other UEs. The SCI may be communicated in the single subchannel over consecutive symbols. In some aspects, communicating the SCI in the selected frequency may include communicating an indicator that indicates a first resource of a PSSCH. In this regard, the indicator may include a delta between an index associated with the selected frequency and an index associated with the first resource of the PSSCH. In this regard, the indicator may include a difference between an index number of the selected subchannel and an index number of the first subchannel of the PSSCH. The indicator may be carried in a reservation field of the SCI carried in the PSCCH. In some aspects, the indicator may be carried in a second stage of the SCI.

Figure 11:
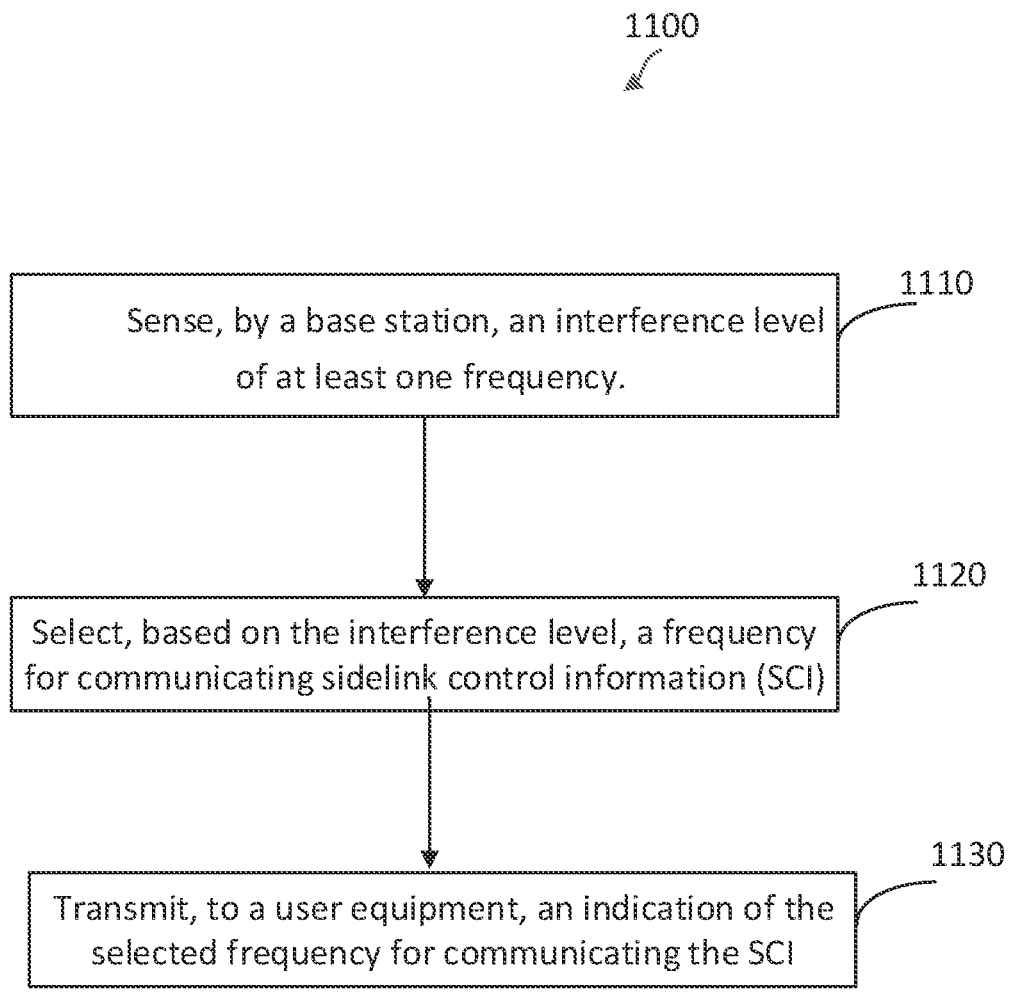
FIG. 11 is a flow diagram of a communication method according to some aspects of the present disclosure.

FIG. 11 is a flow diagram of a communication method 1100 performed by a BS according to some aspects of the present disclosure. Steps of the method 1100 can be executed by a computing device (e.g., a processor, processing circuit, and/or other suitable component) of a communication device or other suitable means for performing the steps. For example, a communication device, such as the BS 105 or the BS 900, may utilize one or more components, such as a processor, a memory, an SCI frequency selection module, a transceiver, a modem, and one or more antennas/transceivers, to execute the steps of method 1100. The method 1100 may employ similar mechanisms as in the networks 100 and 200 and the methods described with respect to FIGS. 2-7. As illustrated, the method 1100 includes a number of enumerated steps, but the method 1100 may include additional steps before, after, and in between the enumerated steps. In some instances, one or more of the enumerated steps may be omitted or performed in a different order.

At step 1110, the method 1100 of wireless communication performed by a BS includes sensing, by the BS, an interference level of at least one frequency (e.g., a subchannel, one or more frequencies, a frequency band, a range of frequencies). Sensing, by the BS, an interference level of at least one frequency may be performed as described above with reference to FIGS. 3-7. In some instances, sensing, by the BS, an interference level of at least one frequency may include sensing an interference level within a subchannel of frequencies. In this regard, the BS may measure sidelink RSRP, SINR, and/or RSSI within candidate frequencies within a window of time.

At 1120, the method 1100 includes selecting a frequency based on the interference level sensed at 1110. In this regard, the BS may identify all the candidate resources. A candidate resource may include a number of adjacent and/or non-adjacent subchannels that may be assigned to a UE in a configured grant. The BS may select a frequency among the candidate resources that has an interference level that satisfies a threshold. In this regard the BS may select the frequency with the lowest interference level.

At 1130, the method 1100 includes transmitting, to a UE, an indication of the selected frequency for communicating the SCI. In some aspects, the BS may transmit the indication of the selected frequency via a configured grant. In this regard, the BS may transmit the indication of the selected frequency via downlink control information (DCI) over a PDCCH. Additionally or alternatively, the BS may transmit to the UE an indication that includes a set of frequencies (e.g., one or more frequencies, a set of subchannels, a set of frequency bands, a range of frequencies) for transmitting the SCI by the UE. In this regard, the UE may consider the set of frequencies as candidate frequencies for transmitting the SCI. The UE may sense the interference level of the set of frequencies and select a single frequency that satisfies an interference level threshold. In this regard, the UE may select a single subchannel of frequencies having the lowest interference level and transmit the SCI in the selected single frequency.

By way of non-limiting examples, the following aspects are included in the present disclosure.

Aspect 1 includes a method of wireless communication performed by a user equipment (UE), the method comprising sensing an interference level of at least one frequency, selecting, based on the interference level, a frequency, and communicating sidelink control information (SCI) in the selected frequency.

Aspect 2 includes the method of aspect 1, wherein the selecting the frequency comprises determining whether the interference level satisfies a threshold.

Aspect 3 includes the method of any of aspects 1-2, wherein the interference level is based on a signal-plus-interference to noise ratio (SINR) associated with the frequency.

Aspect 4 includes the method of any of aspects 1-3, further comprising communicating a physical sidelink control channel (PSCCH) in the selected frequency.

Aspect 5 includes the method of any of aspects 1-4, wherein the selected frequency comprises a single sub-channel.

Aspect 6 includes the method of any of aspects 1-5, wherein the communicating the SCI in the selected frequency comprises communicating the SCI in consecutive orthogonal frequency division multiplexing symbols.

Aspect 7 includes the method of any of aspects 1-6, further comprising communicating an indicator that indicates a first resource of a physical sidelink shared channel (PSSCH).

Aspect 8 includes the method of any of aspects 1-7, wherein the indicator comprises a delta between an index associated with the selected frequency and an index associated with the first resource of the PSSCH.

Aspect 9 includes the method of any of aspects 1-8, wherein the communicating the SCI in the selected frequency comprises transmitting the SCI using a physical sidelink control channel (PSCCH), and wherein the indicator is carried in a reservation field of the SCI.

Aspect 10 includes the method of any of aspects 1-9, wherein the indicator is carried in a second stage of the SCI.

Aspect 11 includes the method of any of aspects 1-10, further comprising determining an estimated gain associated with transmitting the SCI over the at least one frequency, and wherein the selecting the frequency is further based on the estimated gain associated with transmitting the SCI over the at least one frequency.

Aspect 12 includes the method of any of aspects 1-11, further comprising providing the interference level of the at least one frequency to a medium access control (MAC) layer of the UE, and wherein the selecting the frequency comprises selecting, by the MAC layer of the UE, the frequency.

Aspect 13 includes the method of any of aspects 1-12, wherein the providing the interference level of the at least one frequency to the MAC layer of the UE comprises providing a bit map that indicates the interference level of the at least one frequency.

Aspect 14 includes a method of communication performed by a base station (BS), the method comprising sensing an interference level of at least one frequency, selecting, based on the interference level, a frequency for communicating sidelink control information (SCI), and transmitting, to a user equipment (UE), an indication of the selected frequency for communicating the SCI.

Aspect 15 includes the method of aspect 14, wherein the transmitting the indication of the selected frequency for communicating the SCI comprises transmitting the indication of the selected frequency via a configured grant.

Aspect 16 includes the method of any of aspects 14-15, wherein the selecting the frequency for communicating the SCI comprises selecting the frequency for communicating the SCI based on a level of resources associated with a configured grant for the UE.

Aspect 17 includes the method of any of aspects 14-16, wherein the transmitting the indication of the selected frequency for communicating the SCI comprises transmitting the indication of the selected frequency via downlink control information (DCI) over a physical downlink control channel (PDCCH).

Aspect 18 includes the method of any of aspects 14-17, further comprising selecting, based on the interference level, a set of frequencies for communicating the SCI, and wherein the transmitting the indication of the selected frequency comprises transmitting, to the UE, the set of frequencies for communicating the SCI.

Aspect 19 includes the method of any of aspects 14-18, wherein the selecting the frequency comprises determining whether the interference level satisfies a threshold.

Aspect 20 includes the method of any of aspects 14-19, wherein the interference level is based on a signal-plus-interference to noise ratio associated with the frequency.

Aspect 21 includes a user equipment (UE) comprising a transceiver, a memory, and a processor coupled to the transceiver and the memory, the UE configured to perform any one of aspects 1-13.

Aspect 22 includes a base station (BS) comprising a transceiver, a memory, and a processor coupled to the transceiver and the memory, the BS configured to perform any one of aspects 14-20.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   sensing an interference level of at least one frequency;
   selecting, based on the interference level, a frequency sub-channel for a first stage sidelink control information (SCI-1);
   communicating the SCI-1 in the selected frequency sub-channel; and
   communicating, using a selected number of consecutive orthogonal frequency division multiplexing (OFDM) symbols, a second stage sidelink control information (SCI-2) in the selected frequency sub-channel, wherein the consecutive OFDM symbols overlap in time with the communicating the SCI-1, and wherein the selected number of consecutive OFDM symbols is based on the selected frequency sub-channel.

2. The method of claim 1, wherein the selecting the frequency sub-channel comprises:
   determining whether the interference level satisfies a threshold.

3. The method of claim 1, wherein the interference level is based on a signal-plus-interference to noise ratio (SINR) associated with the at least one frequency.

4. The method of claim 1, further comprising communicating a physical sidelink control channel (PSCCH) in the selected frequency sub-channel.

5. The method of claim 1, wherein the selected frequency sub-channel comprises a single sub-channel.

6. The method of claim 1, further comprising:
   communicating an indicator that indicates a first resource of a physical sidelink shared channel (PSSCH).

7. The method of claim 6, wherein the indicator comprises a delta between an index associated with the selected frequency sub-channel and an index associated with the first resource of the PSSCH.

8. The method of claim 6, wherein the communicating the SCI-2 in the selected frequency sub-channel comprises:
   transmitting the SCI-2 using a physical sidelink control channel (PSCCH); and
   wherein the indicator is carried in a reservation field of the SCI-2.

9. The method of claim 6, wherein the indicator is carried in the SCI-2.

10. The method of claim 1, further comprising:
    determining an estimated gain associated with transmitting the SCI-1 over the at least one frequency; and
    wherein the selecting the frequency sub-channel is further based on the estimated gain associated with transmitting the SCI-1 over the at least one frequency.

11. The method of claim 1, further comprising:
providing the interference level of the at least one frequency to a medium access control (MAC) layer of the UE, and
wherein the selecting the frequency sub-channel comprises:
selecting, by the MAC layer of the UE, the frequency sub-channel.

12. The method of claim 11, wherein the providing the interference level of the at least one frequency to the MAC layer of the UE comprises:
providing a bit map that indicates the interference level of the at least one frequency.

13. A method of wireless communication performed by a base station (BS), the method comprising:
sensing an interference level of at least one frequency;
selecting, based on the interference level, a frequency sub-channel for communicating a first stage sidelink control information (SCI-1) and a second stage sidelink control information (SCI-2); and
transmitting, to a user equipment (UE), an indication of the selected frequency sub-channel for communicating the SCI-1 and the SCI-2 and orthogonal frequency division multiplexing (OFDM) symbols for the SCI-1 and the SCI-2, wherein the OFDM symbols for the SCI-1 overlap in time with the OFDM symbols for the SCI-2, and wherein a number of the OFDM symbols for the SCI-2 is based on the selected frequency sub-channel.

14. The method of claim 13, wherein the transmitting the indication of the selected frequency sub-channel for communicating the SCI-1 and the SCI-2 comprises:
transmitting the indication of the selected frequency sub-channel via a configured grant.

15. The method of claim 13,
wherein the selecting the frequency sub-channel for communicating the SCI-1 and the SCI-2 comprises:
selecting the frequency sub-channel based on a level of resources associated with a configured grant for the UE.

16. The method of claim 13, wherein the transmitting the indication of the selected frequency sub-channel comprises:
transmitting the indication of the selected frequency sub-channel via downlink control information (DCI) over a physical downlink control channel (PDCCH).

17. The method of claim 13, wherein the selected frequency sub-channel comprises
a set of frequencies for communicating the SCI-1 and the SCI-2.

18. The method of claim 13, wherein the selecting the frequency sub-channel comprises:
determining whether the interference level satisfies a threshold.

19. The method of claim 13, wherein the interference level is based on a signal-plus-interference to noise ratio associated with the frequency sub-channel.

20. A user equipment (UE) comprising:
a transceiver, a memory, and at least one processor coupled to the transceiver and the memory, wherein the memory stores instructions that are executable by the at least one processor, individually or in any combination, to cause the UE to:
sense an interference level of at least one frequency;
select, based on the interference level, a frequency sub-channel for a first stage sidelink control information (SCI-1); and
communicate the SCI-1 in the selected frequency sub-channel; and
communicate, using a selected number of consecutive orthogonal frequency division multiplexing (OFDM) symbols, a second stage sidelink control information (SCI-2) in the selected frequency sub-channel, wherein the consecutive OFDM symbols overlap in time with the SCI-1, and wherein the selected number of consecutive OFDM symbols is based on the selected frequency sub-channel.

21. The UE of claim 20, wherein the UE is further configured to:
determine whether the interference level satisfies a threshold, wherein the interference level is based on a signal-plus-interference to noise ratio (SINR) associated with the frequency sub-channel.

22. The UE of claim 20, wherein the UE is further configured to:
communicate a physical sidelink control channel (PSCCH) in the selected frequency sub-channel; and
communicate an indicator that indicates a starting frequency of a first resource of a physical sidelink shared channel (PSSCH) in the selected frequency sub-channel.

23. The UE of claim 20, wherein the UE is further configured to:
determine an estimated gain associated with transmitting the SCI-1 over the at least one frequency; and
select the frequency sub-channel further based on the estimated gain.

24. The UE of claim 20, wherein the UE is further configured to:
provide the interference level of the at least one frequency to a medium access control (MAC) layer of the UE; and
select, by the MAC layer of the UE, the frequency sub-channel.

25. A base station (BS) comprising:
a transceiver, a memory, and at least one processor coupled to the transceiver and the memory, wherein the memory stores instructions that are executable by the at least one process, individually or in any combination, to cause the BS to:
sense an interference level of at least one frequency;
select, based on the interference level, a frequency sub-channel for communicating a first stage sidelink control information (SCI-1) and a second stage sidelink control information (SCI-2); and
transmit, to a user equipment (UE), an indication of the selected frequency sub-channel for communicating the SCI-1 and the SCI-2 and orthogonal frequency division multiplexing (OFDM) symbols for the SCI-1 and the SCI-2, wherein the OFDM symbols for the SCI-1 and the SCI-2 overlap in time, and wherein a number of the OFDM symbols for the SCI-2 is based on the selected frequency sub-channel.

26. The BS of claim 25, wherein the BS is further configured to:
transmit the indication of the selected frequency sub-channel via a configured grant.

27. The BS of claim 25, wherein the BS is further configured to:
select the frequency sub-channel for communicating the SCI-1 and the SCI-2 based on a level of resources associated with a configured grant for the UE.

28. The BS of claim 25, wherein the BS is further configured to:

transmit the indication of the selected frequency sub-channel via downlink control information (DCI) over a physical downlink control channel (PDCCH).

29. The BS of claim 25, wherein the selected frequency sub-channel a set of frequencies for communicating the SCI-1 and the SCI-2.

* * * * *